United States Patent [19]
Srinivasan et al.

[11] Patent Number: 5,773,515
[45] Date of Patent: Jun. 30, 1998

[54] ENGINEERED POLYOLEFIN MATERIALS

[75] Inventors: Satchit Srinivasan, Carrollton; Edward Szczepaniak, Arlington, both of Tex.

[73] Assignee: Solvay Engineered Polymers, Grand Prairie, Tex.

[21] Appl. No.: 296,293

[22] Filed: Aug. 25, 1994

[51] Int. Cl.$^6$ .................................................... C08L 23/04
[52] U.S. Cl. ........................................... 525/240; 524/451
[58] Field of Search ....................... 525/240, 88; 524/451

[56] References Cited

U.S. PATENT DOCUMENTS

| | | | |
|---|---|---|---|
| 5,391,618 | 2/1995 | Yamamoto et al. | 525/88 |
| 5,414,027 | 5/1995 | DeNicola et al. | 522/112 |
| 5,416,151 | 5/1995 | Tanaka | 524/484 |
| 5,530,054 | 6/1996 | Tse et al. | 525/240 |
| 5,576,374 | 11/1996 | Betso et al. | 524/451 |
| 5,639,816 | 6/1997 | Yamaguchi et al. | 525/240 |
| 5,639,829 | 6/1997 | Yamaguchi et al. | 525/240 |

FOREIGN PATENT DOCUMENTS

WO 94/06859  3/1994  WIPO .

OTHER PUBLICATIONS

Dow Plastics brochure on Engage Polyolefin Elastomers (1996).

"Dow Launches New Elastomer Family Globally", News Release from Dow Plastics (Feb. 1994).

"Engage Polyolefin Elastomers Fact sheet", News Release from Dow Plastics (Feb. 1994).

G.D. Schwank, Selected Applications for Constrained Geometry Catalyst Technology (CGCT) Polymers, presented at SPO 1992 (Sep. 1992).

S.P. Chum et al., New Polyolefin Based Elastomers For TPO Impact Modification, presented at SPO 1993 (Sep. 1993).

B.A. Story et al., "The New Family of Polyolefins From Insite Technology", presented at MetCon 1993 (1993).

S.P. Chum et al., New Polyolefin Based Elastomers for TPO Impact Modifications (1994) pp. 1–13.

*Primary Examiner*—Cecilia J. Tsang
*Assistant Examiner*—Patrick R. Delaney
*Attorney, Agent, or Firm*—Pennie & Edmonds

[57] ABSTRACT

Thermoplastic olefinic, polymer blends which have superior physical properties and adherence for coating materials such as paints are disclosed. The blends may be formed from various combinations of homopolymers of propylene having an isotactic index >0.93, and/or crystallinity >56%, sequentially polymerized blends of polypropylene and ethylene-propylene copolymers, copolymers of ethylene and butene produced with Kaminsky catalysts, and copolymers of ethylene and octene produced with Kaminsky catalysts with $C_3$–$C_{15}$ alpha olefins.

4 Claims, 5 Drawing Sheets

ENGINEERED POLYOLEFIN MATERIALS

FIELD OF THE INVENTION

The invention relates to thermoplastic olefinic, polymer compositions and products thereof which have superior physical properties and adherence for coating materials such as paints.

BACKGROUND OF THE INVENTION

Polymer blends can be formed or shaped into lightweight and durable articles such as automobile parts, toys, and housings for various types of equipment. Polymer blends such as those with polypropylene and ethylene-propylene copolymers, however, are difficult to form into products which are simultaneously lightweight, easily processed into large parts and have surfaces which are durable and adherent to paints.

Many attempts have been made to enhance the properties of products formed of polymer blends such as those formed of propylene-ethylene copolymers. Japanese patent publication Nos. 57-57049, 62-5460 and 62-5461 each attempt to do so by improving the fluidity and stiffness of blends of polypropylene with ethylene-propylene copolymer. In addition, Japanese patent publication No. 61-19651 also employs blends which have a large amount of propylene.

The propylene-ethylene copolymer blends shown in the above publications suffer from relatively slow crystallization rates. As a result, longer cooling periods are required to manufacture injection molded products. These blends, moreover, do not necessarily provide products which have excellent durability, such as surface smoothness and surface hardness.

Japanese patent publication No. 60-3420 shows a polymer blend which includes polypropylene, ethylene-propylene copolymer, talc and propylene-ethylene block copolymer. This composition is said to show adhesion for coatings as well as low temperature impact resistance.

Japanese patent Laid-Open publication No. 1-204946 shows a composition comprising ethylene-propylene copolymer, polyethylene, ethylene copolymer, polypropylene and talc. This composition is said to provide products which have dimensional stability.

European patent applications EP 0 519 752 A2 and EP 0496 625 A2 each show blends which comprise ethylene copolymer, propylene polymer and propylene-ethylene "block" copolymer and talc. These blends are said to have good processability for injection molding. Ease of processability is often associated with low melt viscosities (high melt flow rates). These high melt flow rates are often detrimental to other physical properties such as impact strength at low temperatures. Injection molded products formed of these blends are said to have good appearance, low density, good surface hardness and impact resistance, as well as good adhesion.

The above mentioned blends are said to have a morphological structure comprised of crystalline domains embedded in amorphous matrix, contrary to conventional thermoplastic polyolefin blends in which elastomer domains are dispersed in a polypropylene matrix. This structure, however, still has regions where the concentration of elastomers is significantly higher than in surrounding areas, thus effectively exhibiting the existence of elastomeric "macrodomains". These macrodomains have an average size >4 $\mu$m, and which may effect negatively some physical properties of the blend.

Although the compositions shown in the aforementioned references are said to possess good processability, products formed of these compositions tend to be deficient in one or more physical properties such as durability and paint-adhesion. A need therefore continues for thermoplastic blends which can be processed to provide products which have combined properties of superior surface hardness, impact resistance, processability, flexural modulus, adhesion of coating, and which can be painted using conventional techniques.

SUMMARY OF THE INVENTION

Figure 1:
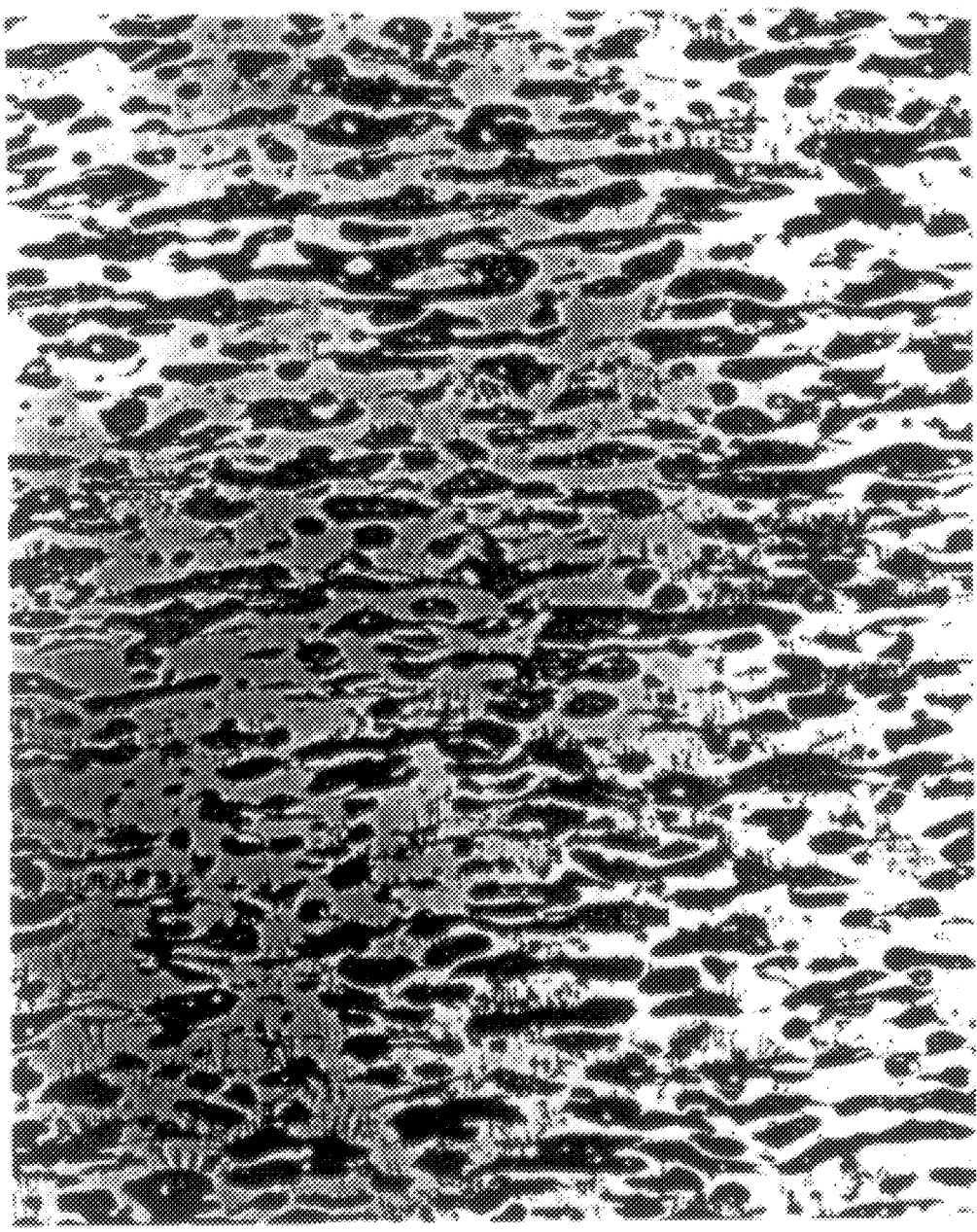
FIG. 1 is a transmission electron micrograph of the core portion of composition of example No. 5 of the invention.

Thermoplastic compositions formed of olefinic, polymer blends and which have superior physical properties and adherence for coating materials such as paints are disclosed. The blends may be formed from various combinations of homopolymers of propylene having an isotactic index >0.93, and/or crystallinity >56%, sequentially polymerized blends of high crystallinity polypropylene and ethylene-propylene copolymers, copolymers of ethylene and butane produced with Kaminsky, or "metallocene" or "single site" catalysts, and copolymers of ethylene and octene produced with metallocene Kaminsky catalysts.

As used herein, the following components are defined as below:

Component (1A): homopolymers and random copolymers of propylene having an isotactic index >0.93, preferably >0.96 and/or a crystallinity >56%, preferably >65%; and/or density >0.898 g/ccm, preferably >0.906 g/ccm;

Component (1B): sequentially polymerized blends or "block" copolymers of polypropylene and copolymers of ethylene with propylene or ethylene with other alpha-olefins;

Component (1C): blends of (1A) and (1B);

Component (2): copolymers of ethylene and butene ("EB") produced with metallocene catalysts having a molecular weight distribution (Mw/Mn)$\leq$3;

Component (3): copolymers of ethylene and octene produced with metallocene catalysts which have a molecular weight distribution (Mw/Mn)$\leq$3, or ethylene with other $C_3$–$C_{15}$ alpha olefins, preferably $C_4$–$C_{10}$ alpha-olefins such as butylene, pentylene, hexylene, septylene, octylene, nonylene, and decylene. These olefins and polymers thereof can be branched or linear.

Useful blends of Group (I) include blends of any one or more of components (1A)–(1C) with component (2) or component (3), such as:

Blend (Ia) formed of combinations of component (1A) with component (2);

Blend (Ib) formed of combinations of component (1A) with component (3);

Blend (Ic) formed of combinations of component (1B) with component (2);

Blend (Id) formed of combinations of component (1B) with component (3);

Blend (Ie) formed of combinations of component (1C) with component (2);

Blend (If) formed of combinations of component (1C) with component (3).

Useful blends of Group (II) include blends of any one of components (1A)–(1C) with component (2) and/or component (3) with any of EP, ethylene-butene ("EB") other than component (2), or $C_3$–$C_{15}$, preferably $C_4$–$C_{10}$, alpha olefins. Illustrative blends of Group (II) include:

Blend (IIa) formed of combinations of component (1A) with component (2) and component (3) and EP;

Blend (IIb) formed of combinations of component (1A) with component (2) and component (3) and EB;

Blend (IIc) formed of combinations of component (1A) with component (2) and component (3) and copolymers of ethylene with any of $C_3$–$C_{15}$, preferably any of $C_4$–$C_{10}$ alpha olefins;

Blend (IId) formed of combinations of component (1B) with component (2) and component (3) and EP;

Blend (IIe) formed of combinations of component (1B) with component (2) and component (3) and EB;

Blend (IIf) formed of combinations of component (1B) with component (2) and component (3) and any of $C_3$–$C_{15}$, preferably any of $C_4$–$C_{10}$ alpha olefins;

Blend (IIg) formed of combinations of component (1C) with component (2) and component (3) and EP;

Blend (IIh) formed of combinations of component (1C) with component (2) and component (3) and EB;

Blend (IIk) formed of combinations of component (1C) with component (2) and component (3) and any of $C_3$–$C_{15}$ alpha olefins, preferably any of $C_4$–$C_{10}$ alpha olefins.

Useful blends of Group (III) can be formed of combinations of any of the blends of Groups (I) or (II) with fillers such as talc or calcium carbonate, mica, glass fibers, etc.

Useful compositions within the scope of the invention can be formed from any of the blends of Groups (I)–(III).

Products formed of any of the blends of Groups (I)–(III) have excellent paintability, a broad range of stiffness values, as well as high impact and tensile strengths which make them suitable for automotive applications.

Blends of any of Groups (I), (II) and (III) suitable for use in the invention have excellent processability, as exhibited by high melt flow rates. Blends of Groups (I)–(III) are particularly suited for injection molding into thin wall articles. Thin wall articles formed of any of blends of Groups (I)–(III) may be used where impact resistance is important. Typical applications include automotive external parts such as bumper covers, as well as interior and exterior automotive component blends.

The blends of the invention can be formed into articles which have a Rockwell R hardness of at least about 60 as measured according to ASTM D-785, a flexural modulus of at least about 80 kpsi as measured according to ASTM D-790, a melt flow rate of at least about 15 dg/min at 230° C. and 2.16 kg as measured according to ASTM D-1238, a minimum density of $\geq 0.89$ g/cc, and are ductile at about $-30°$ C. at a velocity of about 5 mph as measured according to ASTM D-3763. These articles can be coated with paints such as two-component polyurethanes, acrylics, polyesters, epoxy resins, carboimides, urea resins, and melamine-formaldehyde resins.

Having briefly summarized the invention, the invention will now be described in detail by reference to the following specification and non-limiting examples. Unless otherwise specified, all percentages are by weight and all temperatures are in degrees Celsius.

DETAILED DESCRIPTION OF THE INVENTION

Propylene polymers suitable for use in the invention typically have a Melt Flow Rate ("MFR") at 230° C. and 2.16 kg, when measured in accordance with ASTM D-1238 of about 10 to 80 dg/min, preferably about 35 to 65 dg/min, most preferably about 45 to 55 dg/min. These MFRs may be attained by controlling polymerization of the propylene monomer, or by addition of an organic peroxide such as a diacyl peroxide or a dialkyl peroxide after polymerization of the propylene is completed. These techniques are well known in the art.

The propylene polymer employed may be a propylene homopolymer, or a copolymer of propylene and unsaturated monomers such as maleic anhydride, acrylic acid or trimethoxy vinyl silane. These monomers can be introduced to the propylene by graft copolymerization by methods known in the art.

Stereospecific catalysts can be employed in well known methods to produce propylene polymers suitable for use in the invention. Useful stereospecific catalysts can be prepared as disclosed in Japanese Patent Laid-Open Publication Nos. 56-100806, 56-120712 and 58-104907.

Propylene homopolymers useful as component (1A) have an isotactic index of greater than 0.93, preferably greater than 0.96, and/or a crystallinity greater than 56%, preferably greater than 65%, as determined from density measurements. These homopolymers are commercially available, and a good example is the series Eltex P highly isotactic polypropylenes from Solvay.

Ethylene-Propylene ("EP") copolymers which have differing amounts of ethylene and propylene therein may be employed in component (1B) as well as in the blends of Group (II). EP copolymers for use in the invention can be prepared by copolymerizing ethylene and propylene in the presence of free radical coordination stereospecific polymerization catalysts, Phillips catalyst or Kaminsky catalyst or Ziegler-Natta catalyst. These preparation techniques are well known in the art.

Generally, EP copolymers useful in the compositions of the invention can be slightly crystalline or substantially amorphous, and have a Mooney viscosity of about 10–90 at 100° C. The amount of propylene in the EP copolymer is not particularly limited provided that the Mooney viscosity is about 10–90 at 100° C. The EP copolymers may be completely replaced on a one-to-one basis by terpolymers of ethylene-propylene-diene monomers ("EPDMs") such as ethylidene norbornene, dicyclopentadiene, 1,4-hexadiene and the like. Useful copolymers may include mixtures of ethylene-propylene and EPDMs. The total content of ethylene in component (1B) may be between about 0% and about 30%, preferably about 20%. EP copolymers useful in Group (II) blends may have about 30–90% ethylene, preferably about 70% ethylene based on the total weight of the specific blend of Group (II).

The ethylene-butene ("EB") copolymers of component (2) which can be employed in the blends of Groups (I)–(III)

can be produced by use of metallocene catalysts. These copolymers typically have a narrow molecular weight distribution, i.e., (Mw/Mn) of less than 3, where Mw=weight average molecular weight and Mn=number average molecular weight. These EB copolymers can include ethylene in an amount of 5–95%, preferably about 80%.

The ethylene-octene copolymers of component (3) which can be employed in the blends of Groups (I)–(III) also have a narrow molecular weight distribution (Mw/Mn) of less than 3 where Mw and Mn are defined as above. These ethylene-octene copolymers can be produced using well known methods such as those which employ metallocene or Kaminsky catalysts. These ethylene-octene copolymers can have 5–95% ethylene therein, preferably about 80%.

Useful blends of Group (I) can include blends of any of (Ia)–(If) as defined above. In blend (Ia), component (1A) can comprise about 50 to 80%, preferably 60 to 70%, remainder component (2); component (1A) can comprise about 50 to 80%, preferably 60 to 70%, of blend (Ib), remainder component (3); component (1B) can comprise about 50 to 80%, preferably 60 to 70%, of blend (Ic), remainder component (2); component (1B) can comprise 50 to 80% of blend (Id), remainder component (3); component (Ic) can comprise 50 to 80% of the blend (Ie), remainder component (2); component (1C) can comprise 50 to 80% of blend (If), remainder component (3).

The blends of Group (II) can be formed from combinations of any one of components (1A)–(1C) with components (2) and (3) with any of EP, EB other than component (2), or copolymers of ethylene and $C_3$–$C_{15}$, preferably $C_4$–$C_{10}$ alpha olefins such as copolymers of ethylene with at least one of propylene, butylene, pentylene, hexylene, septylene, octylene, nonylene, and decylene. Illustrative Group (II) blends include but are not limited to:

about 50 to 80% component (1A) with about 10 to 35% component (2), about 10 to 25% component (3) and about 0 to 20% EP copolymer;

about 50 to 80% component (1A) with about 10 to 35% component (2), about 10 to 25% component (3) and about 0 to 20% EB copolymer other than component (2);

about 50 to 80% component (1A) with about 10 to 35% component (2), and about 10 to 25% component (3) with about 0 to 20% copolymer of ethylene with at least one of propylene, butylene, pentylene, hexylene, septylene, octylene, nonylene, and decylene;

about 50 to 80% component (1B) with about 10 to 35% component (2), about 10 to 25% component (3) and about 0 to 20% EP copolymer;

about 50 to 80% component (1B) with about 10 to 35% component (2), about 10 to 25% component (3) and about 0 to 20% ethylene-butene copolymer other than component (2);

about 50 to 80% component (1B) with about 10 to 35% component (2), about 10 to 25% component (3), and about 0 to 20% of a copolymer of ethylene with at least one of propylene, butylene, pentylene, hexylene, septylene, octylene, nonylene, and decylene;

about 50 to 80% component (1C) with about 10 to 35% component (2) and about 10 to 25% component (3) with about 0 to 20% EP copolymer;

about 50 to 80% component (1C) with about 10 to 35% component (2) and about 10 to 25% component (3) with about 0 to 20% ethylene-butene copolymer other than component (2); and about 50 to 80% component (1C) with about 10 to 35% component (2) and about 10 to 25% component (3) with about 0 to 20% copolymer of ethylene with at least one of butylene, pentylene, hexylene, septylene, octylene, nonylene, and decylene.

Each of the ethylene-butene copolymers and ethylene-octene copolymers of components (2) and (3) respectively, may be slightly crystalline, i.e., have up to about 20% crystallinity as calculated from density measurements. Preferably, each of the ethylene-butene and ethylene-octene copolymers are substantially amorphous. Amorphous ethylene-butene copolymers are available from Exxon Polymers Co. under the tradename Exxact. Amorphous ethylene-octene copolymers are available from Dow Chemical Co. under the tradename Engage.

Any of the blends of Groups (I) and (II) optionally may be combined with fillers such as talc, glass, mica, or calcium carbonate, and the like, preferably talc, to provide blends of Group III.

Each of blends of Groups (I)–(III) provide products with superior combinations of mechanical and surface properties. Blends of Groups (I)–(III) can be molded into products which show a Rockwell R hardness of at least about 60 as measured according to ASTM D-785, a flexural modulus of at least about 80 kpsi as measured according to ASTM D-790, a melt flow rate of at least about 15 dg/min at 230 C and 2.16 kg as measured according to ASTM D-1238, a maximum density of 0.98 g/cc, and are ductile at −30° C. at a velocity of about 5 mph as measured according to ASTM D-3763.

Talc usable in the blends of Group III has a particle size less than 10 microns, preferably less than 5 microns, most preferably about 0.9 micron, and a specific surface area of about 3.5 $m^2$/g or more, preferably about 3.5–6.0 $m^2$/g. The amount of talc utilized depends on the other component(s) employed in the specific blend of Group (III). Typically, about 0.1 to 10 parts of talc by weight of the component(s), preferably about 0.1 to 5 parts of talc by weight of the component(s), may be employed.

The talc may be prepared by dry pulverization and subsequent dry classification. The average particle size of the talc employed is a particle size at a cumulative amount of 50% by weight in a cumulative particle size distribution curve obtained by a liquid phase sedimentation light transmission method using, for instance, Model CP manufactured by Shimadzu Corp. The specific surface area measuring apparatus Model SS-100 is produced by Shimadzu Corp.

Talc filler employed in the invention need not be treated. However, to improve adhesion between the talc filler and the polymers employed in the blends of Group III, as well as for dispersibility of the talc in those component blends, the talc may be treated with organic titanate coupling agents, silane coupling agents, fatty acids, metal salts of fatty acids, fatty acid esters, and the like.

Various additives may be combined with any of the blends of Groups (I)–(III) unless they substantially impair the advantageous properties of those component blends. Useful additives include for example, process stabilizers, antioxidants, ultraviolet absorbers, soaps such as metal soaps, anti-static agents, lubricants, nucleating agents, pigments and dispersant for pigment. In addition, additives capable of imparting higher flexural modulus to the blend than that imparted by talc can be included. Examples of these additives include fibrous potassium titanate, fibrous magnesium oxalate, fibrous aluminum borate, and carbon fibers.

Figure 2:
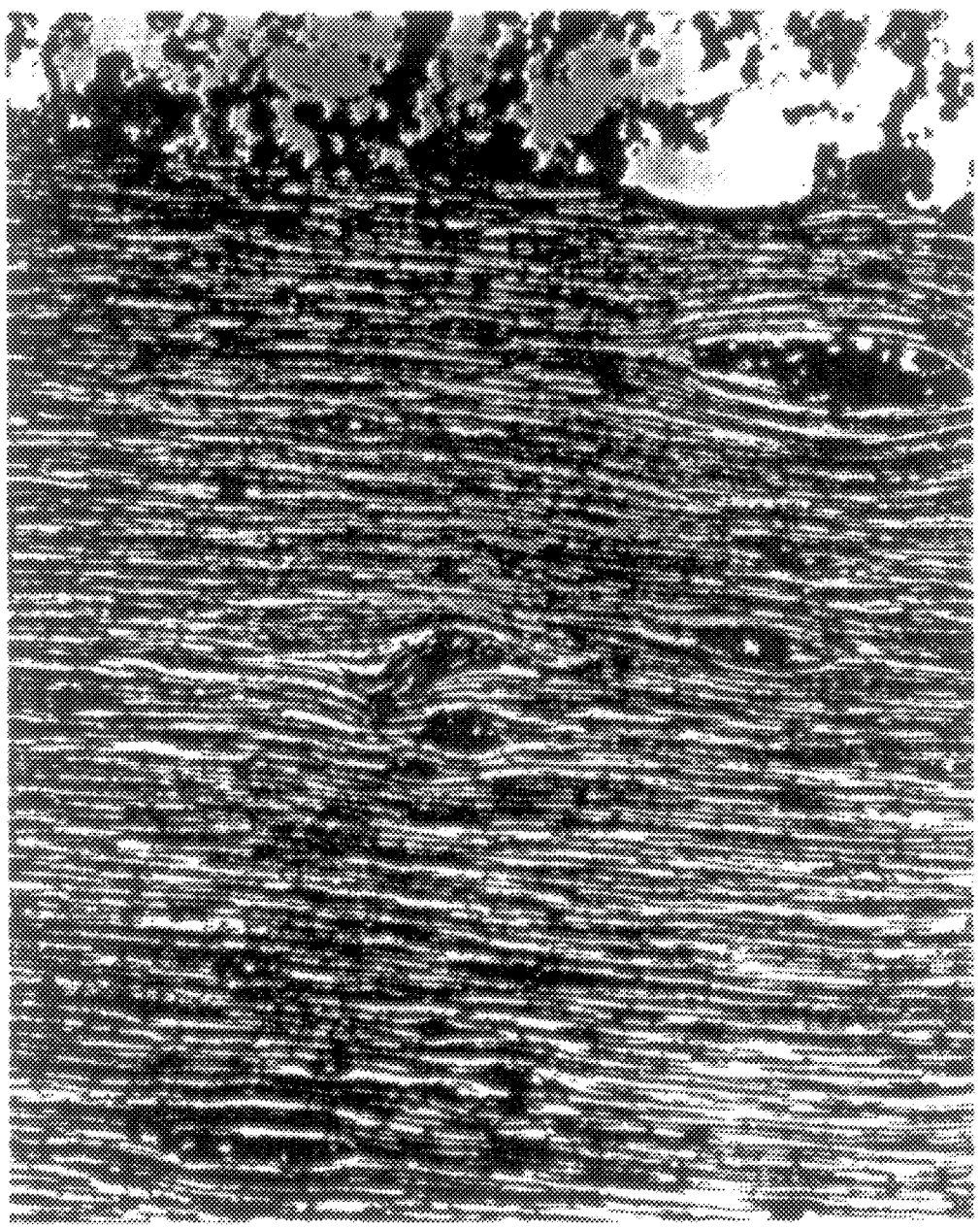
FIG. 2 is a transmission electron micrographs of the skin layer of the composition of example No. 5 of the invention.
Figure 3:
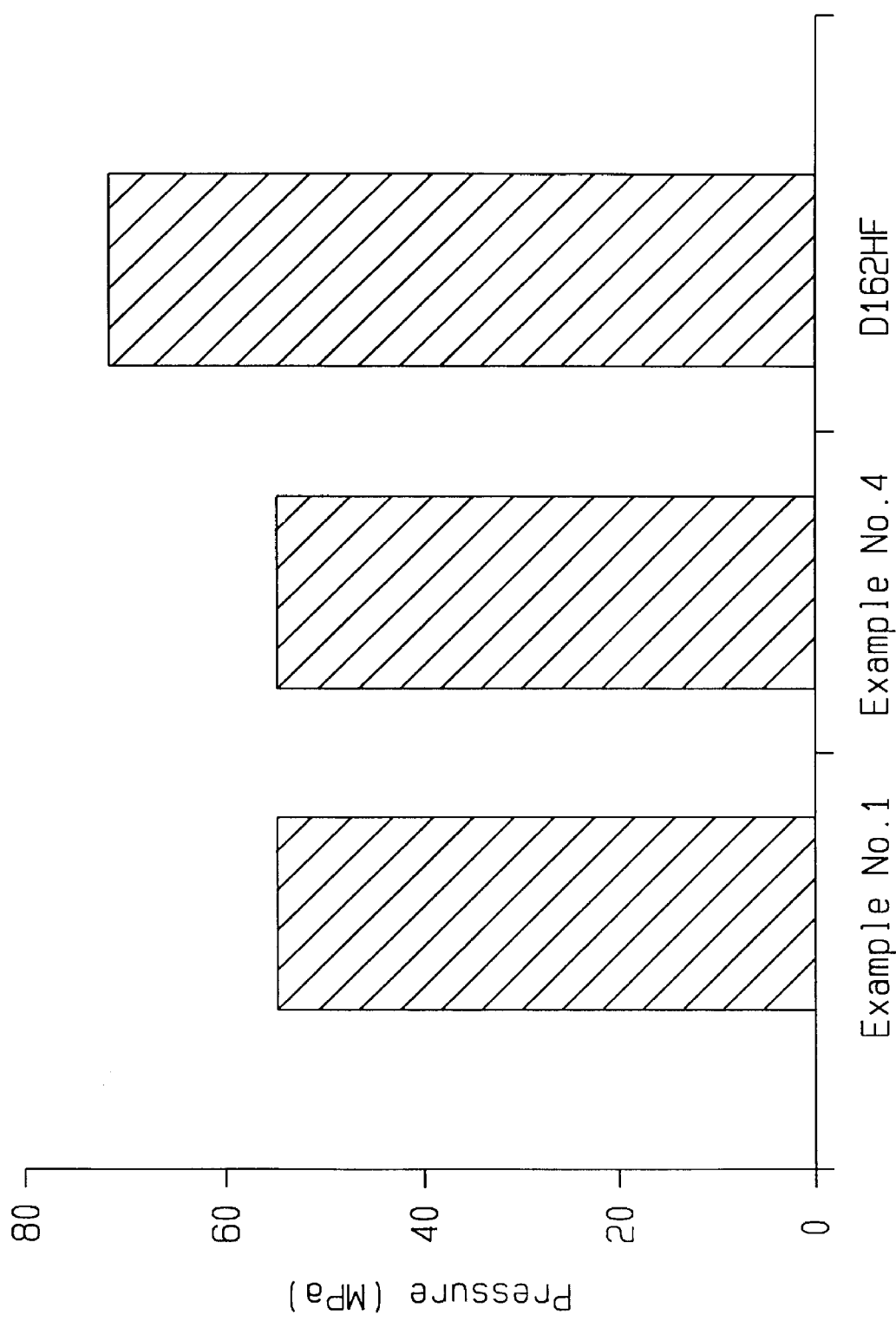
FIG. 3 compares injection molding pressures of the compositions of examples 1 and 4 of the invention to commercially available composition.
Figure 4:
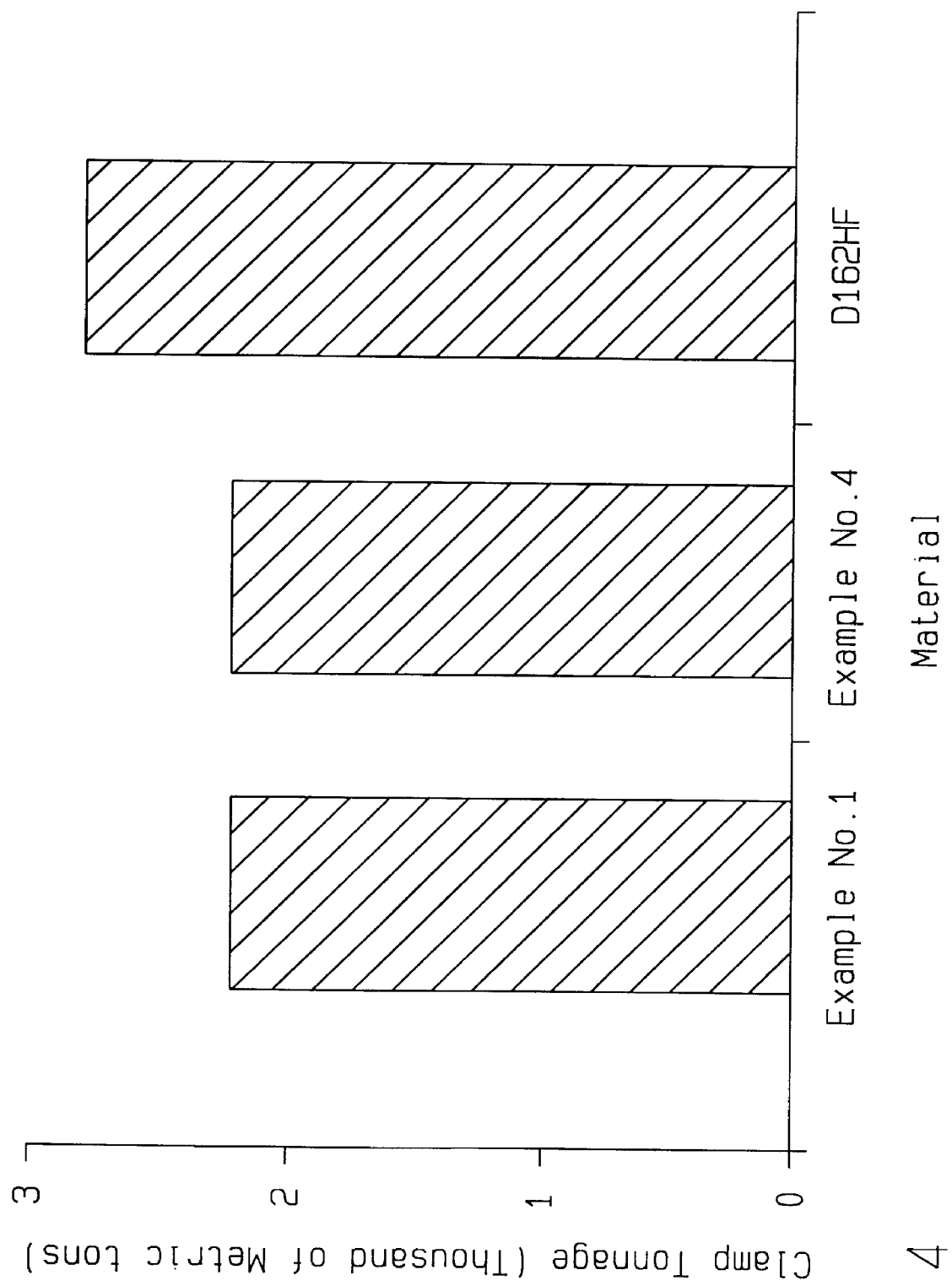
FIG. 4 compares clamp tonnage to fill a mold with the compositions of examples 1 and 4 of the invention to commercially available composition D162HF.

Morphology of blends of Groups (I)–(III) shows excellent dispersion of components with the biggest domains being the filler particles. Apart from the filler, the average domain size is <2 μm. This indicates excellent compatibility of components as shown in FIGS. 1 and 2. This compatibility, combined with the high melt flow rate of the blend, leads to a characteristic thin layering typically less than about 0.5 μm, near the surface of the injection molded specimens produced from the compositions of the invention. This is illustrated in FIGS. 3 and 4 which show the morphology of the skin layer of specimens formed from the composition of example 5 of the invention.

The blends of Groups (I)–(III) can be molded or otherwise formed to produce articles which are lightweight, durable, and have surfaces which are paint receptive. The components also can be pelletized for storage and shipment prior to molding into shaped articles by known methods.

Products formed of any of the blends of Groups (I)–(III) can be coated with paints, particularly with paints such as commercially available two-component blend polyurethanes to provide products with superior fluid resistance. The blends of Groups (I)–(III) may be coated with paints which have active functional groups such as acrylics, polyesters, epoxy resins, carboimides, urea resins, melamine-formaldehyde resins, enamines, ketimines, amines, and isocyanates to provide products with improved fluid resistance. These types of paints are well known in the paint and coatings industry.

Products having superior physical properties and adherence for coating materials such as paints can be prepared by mixing any of the blends of Groups (I)–(III) with, if desired, optional additives by using extruders, Banbury mixers, rollers, brabenders and kneaders. Molded products may be prepared from any of blends of Groups (I)–(III) by known methods such as injection molding, extrusion molding, and blow molding. Injection molding is preferred.

Blends of Groups (I)–(III) present a significant advantage in injection molding compared to conventional thermoplastic polyolefin blends. A computer simulation of the molding conditions for the blends of Groups (I)–(III) show lower injection pressure, lower clamp tonnage and shorter cycle time than conventional thermoplastic polyolefin blends having comparable viscosities under standard conditions.

The computer simulation, performed using the commercial software package C-Mold from AC Technologies, requires input of rheological and thermodynamic properties of the material under consideration. These properties can be determined experimentally. The required properties are viscosity as a function of shear rate between 5 sec$^{-1}$ and 10,000 sec$^{-1}$ at temperatures of 200° C., 230° C. and 260° C.; specific heat as a function of temperature between room temperature and 250° C., as well as density of the material in the solid state and as melted are also required. The thermoplastic polyolefin blend which serves as a control is D162HF. D162HF, available from D&S Plastics, has the highest melt flow rate for commercially available thermoplastic olefin blends.

Figure 5:
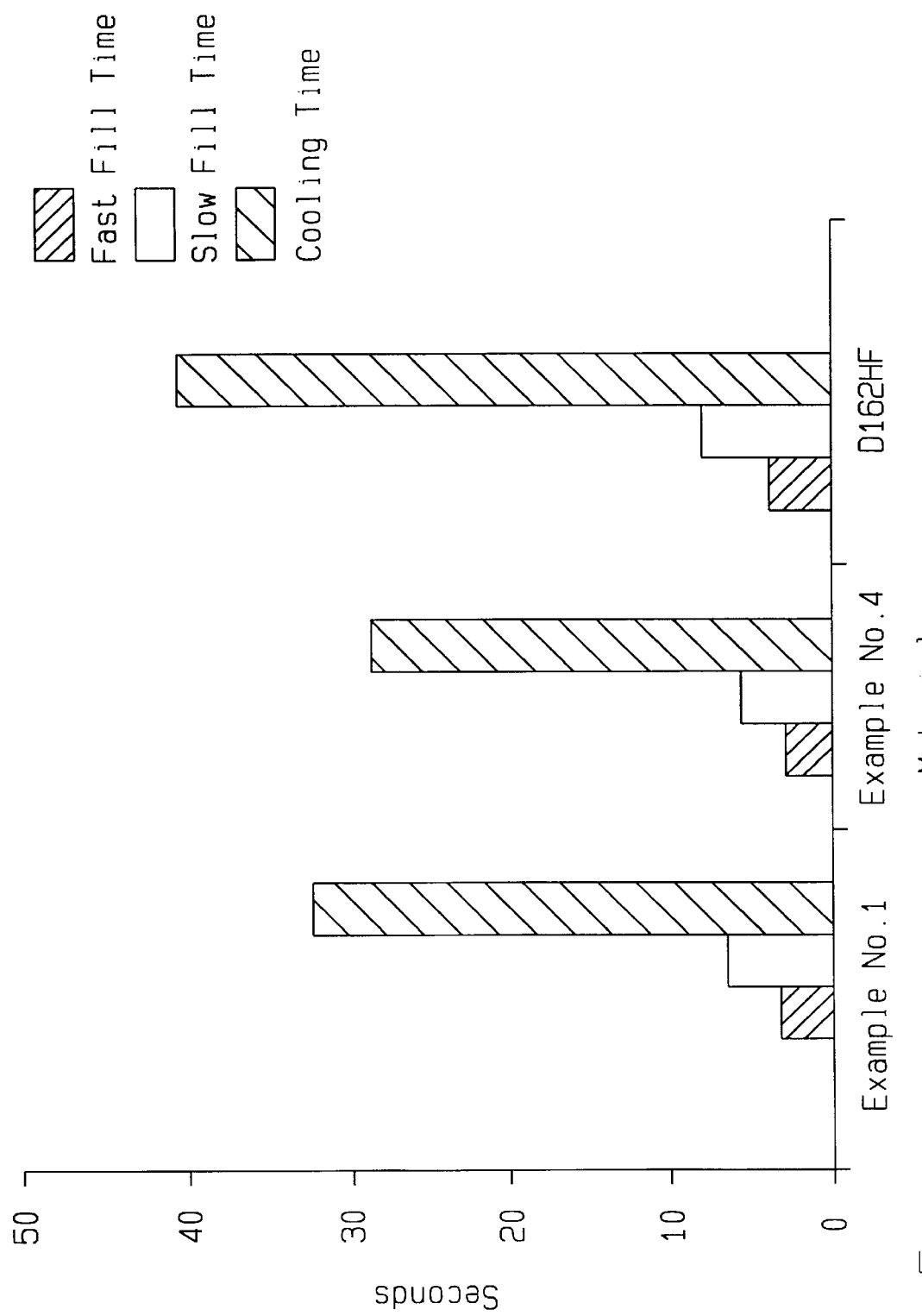
FIG. 5 compares the cool/fill times to fill a mold with the compositions of examples 1 and 4 of the invention to commercially available composition D162HF.

As shown in FIGS. 5–7, the computer simulation indicates that the maximum injection molding pressure, the clamp tonnage, as well as the fill/cool times for the compositions of Examples 1 and 4 of the invention are much less than for commercially available composition D162HF.

Generally, processing of the components of the invention can be performed using Banbury mixers or twin screw extruders. When a Banbury mixer is employed to prepare any of blends of Groups (I)–(III), a single screw extruder can be used to pelletize that component blend. The resulting pellets then are supplied to an injection molding machine for manufacture of molded articles.

During mixing of the blends of Groups (I)–(III) with a Banbury mixer, the ram pressure in the Banbury mixer is about 30–35 psi. Mixing is continued until fluxing temperature is achieved, i.e., the temperature at which the viscosity of the blend drops sharply. When fluxing temperature is achieved, mixing is terminated and the resulting batch of material is removed from the Banbury mixer. The batch then is ground into chips and/or pelletized in a single screw extruder.

Pellets of the formed component blends are supplied to an injection molding machine for injection molding into shaped products.

The invention will now be explained in more detail with reference to the following examples, which are given merely to illustrate the invention and are not intended to be limiting thereof.

EXAMPLES 1–6

The compositions of examples 1–6 are given in Table 1. Table 1 also shows the physical properties of the compositions when processed according to the conditions set forth in Table 1A. In Table 1, Ductility Index is measured by using a High Rate Impact Tester machine Model No. RIT-8000 from Rheometrics Company, Piscataway, N.J. The RIT-8000 is equipped with a steel probe having a size measuring 0.5" diameter by 12.25" long, and having a weight of about 0.705 lb. The probe has a spherical tip. The probe is accelerated to penetrate a specimen measuring 4"×6"×⅛" at a constant speed of 5 mph. The temperature of the specimen is −30° C.

Ductility Index is calculated from the equation $$DI=(T-U)/T$$

where
DI=Ductility Index,
T represents total energy at the point at which the probe has broken through the specimen, i.e., the point at which the force applied to the specimen by the probe drops to zero, and
U represents ultimate energy, i.e., the energy at the point at which the force exerted by the probe on the specimen is at maximum as determined from the force-position curve of force applied by the probe to the specimen vs. the position of the probe. The DI values for each of 3–5 specimens are averaged and reported as DI.

Also, in Tables 1 and 2, the peel strength is the force (g/cm) required to peel the paint off substrate, is a measure of adhesive strength of the coating to the substrate.

In determining the peel strength, an injection molded plaque, formed of a composition of the invention, of size 4×6 inches and ⅛ inch thick, is partially coated with the adhesion promoter RB899 from Morton International Co., and entirely with a topcoat of R773 from Morton, International Co. to enable lifting the topcoat from that portion of the plaque which is not coated with the adhesion promoter.

Cuts through the topcoat coating are made using a sharp knife and a metal template to form two or three one cm wide strips. The one cm side strips are slowly peeled from those portions of the plaque which are free of the adhesion promoter. A piece of polyester tape is placed on the peeled off strip to form a "handle" with which the strip is peeled further.

The prepared plaque is placed into an Instron Tensile Tester (Instron Model 1130).

The force required to peel the strip from the plaque is recorded as a function of the length of peeled off strip along the plaque. The peeling speed is two inches per minute. The average force in the entire peel is reported as the measure of adhesion strength per one cm of width of peel, i.e., in units of g/cm.

TABLE 1

| Example No./Component % | 1 | 2 | 3 | 4 | 5 | 6 | Standard TPO (Control) |
|---|---|---|---|---|---|---|---|
| PP[1] | 62 | 62 | 65 | 65 | — | — | — |
| PP[2] | — | — | — | — | 62 | — | — |
| PP[3] | — | — | — | — | — | 62 | — |
| EPR[4] | — | — | — | — | — | — | — |
| EBR[5] | — | — | — | — | — | — | — |
| Poly(ethylene-co-butene)[6] | 22 | 11 | 17.5 | 12 | 22 | 22 | — |
| Poly(ethylene-co-octene)[7] | 11 | 22 | 17.5 | 23 | 11 | 11 | — |
| FILLER[8] | 5 | 5 | 0 | 0 | 5 | 5 | — |
| HARDNESS[9] | 77 | 69 | 71 | 69 | 75 | 76 | 45 |
| FLEXURAL MODULUS[10] | 197 | 190 | 163 | 163 | 214 | 213 | 220 |
| MFR[11] | 19 | 22 | 24 | 27 | 18 | 27 | 12 |
| DENSITY[12] | .93 | .93 | .90 | .89 | .93 | .93 | 1.02 |
| IMPACT @-30C[13] | D | D | D | D | D | D | B |
| DUCTILITY INDEX | .38 | .36 | .34 | .36 | .38 | .37 | .25 |
| PEEL STRENGTH | 1050 | 1200 | 780 | 1200 | 830 | 1085 | 1000 |

[1]Polypropylene, MFR at (230 C, 2.16 kg) = 45 dg/min, ASTM D-1238
[2]Polypropylene, MFR at (230 C, 2.16 kg) = 49 dg/min, ASTM D-1238
[3]Polypropylene, MFR at (230 C, 2.16 kg) = 56 dg/min, ASTM D-1238
[4]Poly(ethylene-co-propylene); C2 = 50%, C3 = 50%, Mooney Viscosity at 100° C. = 35
[5]Poly(ethylene-co-butene); C2 = 75%, C4 = 25%; MFR at (190 C, 2.16 kg) = 0.8 dg/min
[6]Exxact 4033 from Exxon Co., produced by Kaminsky catalyst process, and having C2 = 80%; MFR at (190 C, 2.16 kg) = 0.3 dg/min, ASTM D-1238
[7]C2 = 80%; MFR at (190 C, 2.16 kg) = 5.0 dg/min, ASTM D-1238
[8]Average talc particle size = 0.9 micron
[9]Rockwell R hardness measured according to ASTM D-785
[10]Kpsi measured according to ASTM D-790
[11]dg/min at (230 C, 2.16 kg) as measured according to ASTM D-1238
[12]g/cc
[13]D = Ductile Failure; B = Brittle Failure measured according to ASTM D-3763

TABLE 1(a)

Processing Conditions

| EXAMPLE/PROCESSING CONDITION | 1 | 2 | 3 | 4 | 5 | 6 |
|---|---|---|---|---|---|---|
| BANBURY MIXING | | | | | | |
| ROTOR SPEED (RPM) | 185 | 185 | 190 | 190 | 185 | 185 |
| RAM PRESSURE (PSI) | 32 | 32 | 34 | 34 | 32 | 32 |
| TIME TO FLUX (SEC) | 95 | 95 | 90 | 90 | 95 | 95 |
| FLUX TEMP (°F.) | 360 | 360 | 355 | 355 | 360 | 360 |
| BATCH TEMP (°F.) | 410 | 410 | 410 | 410 | 410 | 410 |
| PELLETIZING SINGLE SCREW EXTRUDER | | | | | | |
| END ZONES TEMP (°F.) | 360 | 360 | 360 | 360 | 360 | 360 |
| CENTRAL ZONE TEMP (°F.) | 380 | 380 | 380 | 380 | 380 | 380 |
| SCREW SPEED (RPM) | 95 | 95 | 95 | 95 | 95 | 95 |
| MELT TEMP (°F.) | 375 | 375 | 375 | 375 | 375 | 375 |
| MOLDING TEMPERATURE | | | | | | |
| END ZONE 1 | 340 | 340 | 340 | 340 | 340 | 340 |
| CENTRAL ZONE 2 | 360 | 360 | 360 | 360 | 360 | 360 |
| CENTRAL ZONE 3 | 360 | 360 | 360 | 360 | 360 | 360 |
| END ZONE 4 | 340 | 340 | 340 | 340 | 340 | 340 |

TABLE 1(a)-continued

Processing Conditions

| EXAMPLE/PROCESSING CONDITION | 1 | 2 | 3 | 4 | 5 | 6 |
|---|---|---|---|---|---|---|
| SCREW SPEED (RPM) | 90 | 90 | 90 | 90 | 90 | 90 |
| MOLD TEMP (°F.) | 80 | 80 | 80 | 80 | 80 | 80 |
| INJECTION TIME (SEC) | 10 | 10 | 10 | 10 | 10 | 10 |
| COOLING TIME (SEC) | 25 | 25 | 25 | 25 | 25 | 25 |
| INJECTION PRESSURE | 550 | 550 | 550 | 550 | 550 | 550 |
| FILLING TIME (PSI) | 10 | 10 | 10 | 10 | 10 | 10 |
| HOLDING PRESSURE (PSI) | 430 | 430 | 430 | 430 | 430 | 430 |
| HOLDING TIME (SEC) | 15 | 15 | 15 | 15 | 15 | 15 |
| BACK PRESSURE (PSI) | 50 | 50 | 50 | 50 | 50 | 50 |

EXAMPLES 7–11

Table 2 illustrates additional compositions within the scope of the invention. Table 2 also shows the physical properties of the compositions when processed according to the conditions set forth in Table 2a. Ductility index and peel strength are measured as in Examples 1–6.

TABLE 2

| EXAMPLE No./Component (%) | 7 | 8 | 9 | 10 | 11 |
|---|---|---|---|---|---|
| HIPP[1] | 62 | 62 | 62 | 62 | 62 |
| HIPP[2] | — | — | — | — | — |
| HIPP[3] | — | — | — | — | — |
| EPR[4] | 33 | — | 16.5 | — | — |
| EBR[5] | — | 33 | 16.5 | — | — |
| Poly(ethylene-co-butene)[6] | — | — | — | 33 | — |
| Poly(ethylene-co-octene)[7] | — | — | — | — | 33 |
| FILLER[8] | 5 | 5 | 5 | 5 | 5 |
| HARDNESS[9] | 45 | 60 | 55 | 79 | 74 |
| FLEXURAL MODULUS[10] | 175 | 200 | 185 | 203 | 193 |
| MFR[11] | 14 | 14 | 14 | 16 | 24 |
| DENSITY[12] | 0.93 | 0.93 | 0.93 | 0.93 | 0.93 |
| IMPACT @-30C[13] | D | B | B | B | B |
| DUCTILITY INDEX | 0.37 | 0.10 | 0.25 | 0.28 | 0.25 |
| PEEL STRENGTH | 1100 | 240 | 500 | 450 | 1180 |

[1]High crystallinity polypropylene, MFR at (230 C, 2.16 kg) = 45 dg/min, ASTM D-1238
[2]High crystallinity polypropylene, MFR at (230 C, 2.16 kg) = 49 dg/min, ASTM D-1238
[3]High crystallinity polypropylene, MFR at (230 C, 2.16 kg) = 56 dg/min, ASTM D-1238
[4]Poly(ethylene-co-propylene); C2 = 50%, C3 = 50%, Mooney Viscosity at 100° C. = 35
[5]Poly(ethylene-co-butene); C2 = 75%,. C4 = 25%; MFR at 190° C., 2.16 kg = 0.8 dg/min, prepared by conventional process, e.g., Flexomer (Union Carbide), Tafmer (Mitsui Petrochemical)
[6]Exxact 4033 from Exxon Co., produced from Kaminsky catalyst, and having C2 = 80%; MFR at (190 C, 2.16 kg) = 0.3 dg/min, ASTM D-1238
[7]C2 = 80%; MFR at (190 C, 2.16 kg) = 5.0 dg/min, ASTM D-1238
[8]Talc, particle size = 0.9 micron
[9]Rockwell R hardness measured according to ASTM D-785
[10]Kpsi measured according to ASTM D-790
[11]dg/min at 230 C and 2.16 kg as measured according to ASTM D-1238
[12]g/cc
[13]D = Ductile Failure; B = Brittle Failure measured according to ASTM D-3763

TABLE 2 (a)

Processing Conditions

| EXAMPLE/PROCESSING CONDITION | 1 | 2 | 3 | 4 | 5 |
|---|---|---|---|---|---|
| BANBURY MIXING | | | | | |
| ROTOR SPEED (RPM) | 185 | 185 | 185 | 185 | 185 |
| RAM PRESSURE (PSI) | 32 | 32 | 32 | 32 | 32 |
| TIME TO FLUX (SEC) | 110 | 110 | 110 | 95 | 95 |
| FLUX TEMP (F°) | 380 | 380 | 380 | 360 | 360 |
| BATCH TEMP (°F.) | 420 | 420 | 420 | 410 | 410 |
| PELLETIZING | | | | | |
| END ZONE TEMP (°F.) | 360 | 360 | 360 | 360 | 360 |
| CENTRAL ZONE TEMP (°F.) | 380 | 380 | 380 | 380 | 380 |
| SCREW SPEED (RPM) | 90 | 90 | 90 | 95 | 95 |
| MELT TEMP (°F.) | 380 | 380 | 380 | 375 | 375 |
| MOLDING TEMPERATURE | | | | | |
| END ZONE 1 | 360 | 360 | 360 | 340 | 340 |
| CENTRAL ZONE 2 | 380 | 380 | 380 | 360 | 360 |
| CENTRAL ZONE 3 | 380 | 380 | 380 | 360 | 360 |
| END ZONE 4 | 360 | 360 | 360 | 340 | 340 |
| SCREW SPEED (RPM) | 85 | 85 | 85 | 90 | 90 |
| MOLD TEMP (°F.) | 80 | 80 | 80 | 80 | 80 |
| INJECTION TIME (SEC) | 10 | 10 | 10 | 10 | 10 |
| COOLING TIME (SEC) | 25 | 25 | 25 | 25 | 25 |
| INJECTION PRESSURE (PSI) | 750 | 750 | 750 | 550 | 550 |
| FILLING TIME (SEC) | 10 | 10 | 10 | 10 | 10 |
| HOLDING PRESSURE (PSI) | 550 | 550 | 550 | 430 | 430 |
| HOLDING TIME (SEC) | 15 | 15 | 15 | 15 | 15 |
| BACK PRESSURE (PSI) | 50 | 50 | 50 | 50 | 50 |

Other aspects of the invention will be apparent to those skilled in the art from consideration of the specification, or from practice of the invention disclosed herein. It is intended that the specification and examples be considered as exemplary only, with the scope and spirit of the invention being indicated by the following claims.

What is claimed is:

1. A thermoplastic material consisting essentially of a blend of about 50–80% by weight of a homopolymer of propylene having an isotactic index which is greater than 0.93 or a crystallinity which is greater than 56%; about 12–22% by weight of a copolymer of ethylene and butene produced with a metallocene or Kaminsky catalyst and having a molecular weight distribution (Mw/Mn) which is less than or equal to 3; about 11–23% by weight of a copolymer of ethylene and octene produced with a metallocene or Kaminsky catalyst and having a molecular weight distribution (Mw/Mn) which is less than or equal to 3; and about 0.1 to 10% by weight of filler.

2. The thermoplastic material of claim 1 wherein the copolymer of ethylene and butene is substantially amorphous and produced with a metallocene catalyst, the copolymer of ethylene and octene is substantially amorphous and produced with a metallocene catalyst, and the filler is talc and is present in an amount of about 0.1 and 5%.

3. The thermoplastic material of claim 2 wherein the material has a peel strength of at least about 780, a ductility index of at least about 0.34 and a ductile impact resistance to as low as about −30° C.

4. The thermoplastic material of claim 2 wherein the ethylene octene copolymer is present in a greater amount than that of the ethylene butene copolymer so that the material has a peel strength of at least about 1200 and a ductility index of at least about 0.36.

* * * * *